(12) United States Patent
Guender et al.

(10) Patent No.: US 10,982,407 B2
(45) Date of Patent: Apr. 20, 2021

(54) BASEPLATE FOR A HYDRAULIC APPLIANCE, AND HYDRAULIC APPLIANCE

(71) Applicant: Robert Bosch GmbH, Stuttgart (DE)

(72) Inventors: Andreas Guender, Ramsthal (DE); Jan Lukas Bierod, Bad Camberg (DE); Ralf Maier, Neuendorf (DE); Rene Huettl, Chemnitz (DE); Marco Scholz, Burgsinn (DE); Stefan-Georg Backhaus, Partenstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/655,077

(22) Filed: Oct. 16, 2019

(65) Prior Publication Data
US 2020/0123729 A1    Apr. 23, 2020

(30) Foreign Application Priority Data
Oct. 19, 2018   (DE) ..................... 10 2018 126 115.2

(51) Int. Cl.
*F16M 13/00*   (2006.01)
*E02D 27/44*   (2006.01)
*F16M 9/00*    (2006.01)
*F15B 20/00*   (2006.01)

(52) U.S. Cl.
CPC ............... *E02D 27/44* (2013.01); *F16M 9/00* (2013.01); *F15B 20/005* (2013.01)

(58) Field of Classification Search
CPC .......... E02D 27/44; F16M 9/00; B65D 19/38; B65D 19/18
See application file for complete search history.

(56) References Cited

U.S. PATENT DOCUMENTS

| | | | |
|---|---|---|---|
| 7,607,628 B2* | 10/2009 | Elder ................. | B65D 19/0036 108/53.3 |
| 10,479,553 B2* | 11/2019 | Guerry ................ | B65D 19/38 |
| 2015/0108037 A1* | 4/2015 | Evans ................ | B65D 19/18 206/600 |

FOREIGN PATENT DOCUMENTS

EP    2 230 406 A2    9/2010

* cited by examiner

*Primary Examiner* — Amy J. Sterling
(74) *Attorney, Agent, or Firm* — Maginot, Moore & Beck LLP

(57) ABSTRACT

A baseplate has a top side that includes a support surface and a collecting surface. A hydraulic appliance is configured to be fastened on the support surface. The collecting surface is arranged lower in relation to the support surface so as to collect leakage oil of the appliance.

17 Claims, 4 Drawing Sheets

BASEPLATE FOR A HYDRAULIC APPLIANCE, AND HYDRAULIC APPLIANCE

This application claims priority under 35 U.S.C. § 119 to patent application no. DE 10 2018 126 115.2, filed on Oct. 19, 2018 in Germany, the disclosure of which is incorporated herein by reference in its entirety.

BACKGROUND

The disclosure relates to a baseplate for a hydraulic appliance and to a hydraulic appliance.

Drives, for example a motor-pump assembly, for hydraulic appliances are commonly fastened by means of damping bearings to a tank of the hydraulic appliance. Here, it is for example the case that damping elements, for example a damping ring or a damping rail, are arranged between the drive and the tank. It is also possible for the drive of the appliance to be installed adjacent to the tank, for example by means of a steel structure. These solutions often require additional damping components in order to compensate the vibration of the drives. Separate oil troughs are often used in order to collect leakage that escapes from the appliance.

The document EP 2 230 406 A2 describes a liquid ring gas pump system, at least composed of a liquid ring gas pump, a drive motor and an operating medium separator, and a machine foundation, wherein the machine foundation has at least one operating medium channel.

SUMMARY

By contrast, the problem addressed by the disclosure is that of creating a baseplate for a hydraulic appliance with enhanced functionality, and a hydraulic appliance with enhanced functionality.

Said object is achieved by way of a baseplate for a hydraulic appliance as per the disclosure, and by way of a hydraulic appliance as per the disclosure.

The subclaims relate to advantageous refinements of the disclosure.

According to the disclosure, a baseplate or a base foundation or a foundation for the support, carrying and/or fastening of a hydraulic appliance or appliance is provided. The baseplate preferably has a bottom side, in particular situated close to the ground, and a top side, on which at least one support surface for the appliance is provided. It is preferable for a drive unit, for example a motor-pump assembly, and a tank of the appliance to be fastenable on the support surface. For this purpose, the support surface may preferably be of planar design. The support surface may be of unipartite or coherent form, but the support surface preferably has a multiplicity of support surface portions. It is advantageously possible for a collecting surface, which is lowered in relation to the support surface, to be provided on the top side of the baseplate for the purposes of collecting leakage of the appliance.

This solution has the advantage that, in this way, a machine foundation and the function of a drip pan can be combined by the baseplate, such that fewer individual parts have to be stocked and/or installed. The baseplate particularly preferably performs the function of a drip pan in accordance with requirements of the Water Resources Act. Furthermore, an integrated drip pan can reduce a risk of accidents when working with the appliance, because even a large quantity of leakage oil that arises is collected. It is thus possible, for example, to prevent slipping on the workspace.

The lowered collecting surface may thus advantageously have a form similar to an oil pan. The baseplate may in this case be designed so as to form a base unit of the appliance. The appliance can preferably be set up on a floor, for example on a hall floor or on a vehicle floor.

It is advantageously the case that the collecting surface, at least in certain portions, is formed in the manner of a channel or has at least one, in particular central, channel at least in certain portions. Here, the collecting surface may for example be of V-shaped form in cross section, with the channel at the apex. It is thus possible for fluid, for example leakage oil from the appliance, which strikes any region of the collecting surface, to always be diverted in the direction of the channel. In other words, every region of the collecting surface opens out in the or a channel. A surface geometry of the collecting surface may thus for example be designed so as to lead toward a central, relatively low-lying region, for example of the channel.

The baseplate is furthermore advantageously produced at least in certain portions and/or entirely from polymer concrete. The baseplate is of advantageously strong design as a single piece. Polymer concrete is particularly advantageous because this material forms a tough, dimensionally stable and robust and vibration-damping structure. Additionally, no coating of this component is necessary in order to satisfy the requirements of the Water Resources Act. In this way, it is advantageously possible for a production process and/or installation of the baseplate to be simplified and made inexpensive, because no further process steps for lacquering and/or coating the baseplate are involved. The baseplate can thus, in other words, be of particularly installation-compatible design. The baseplate is particularly advantageously cast, for example by means of a molding tool. Through the use of polymer concrete, an unpressurized casting process is made possible. This can be carried out in a simple manner in terms of apparatus. A further possible material for the baseplate is for example gray cast iron. Following the casting process, this can subsequently be coated, for example zinc-plated.

Through the use of a baseplate composed of polymer concrete for the hydraulic appliance, it is furthermore possible for a center of gravity of the appliance, which is of very tall construction, to be shifted in the direction of the floor. It is thus possible, in other words, to realize an increase of a carrier mass or of a carrying mass of the appliance. Extremely stable standing of the appliance, both during operation and during transport, is thus advantageously made possible.

Owing to the damping action of polymer concrete, it is furthermore possible to omit expensive components such as for example damping bearings. Through the reduction of components, it is advantageously possible for an installation process or a production process of the baseplate to be simplified, and also to be made less expensive.

It is advantageous for at least one fastening means for the fastening of the appliance and/or of at least one component of the appliance and/or of a further component and/or of a further attachment part to be provided on the baseplate. The fastening means may advantageously be connected in positively locking fashion to the baseplate. A non-positively locking and/or cohesive connection is likewise conceivable. For example, it is possible that, during the casting process for the baseplate, the at least one fastening means is directly jointly cast into the baseplate. This may thus for example involve, in particular metallic, "inserts" or inlay pieces which are integrated into the baseplate and which serve for the fastening of attachment parts, that is to say for example components of the appliance. It is also possible for the fastening means to be adhesively bonded to the baseplate. A fastening means may preferably have a thread.

This may for example involve a threaded pin and/or a threaded bolt with an internal or external thread. The fastening means may for example form a recess on the baseplate, in particular with an internal thread, or may project out of the baseplate, in particular with an external thread.

At least one component of the appliance or multiple components of the appliance may be rigidly connected to the baseplate by the fastening means. It is furthermore possible for an installation of further components to be facilitated and/or optimized by the fastening means, which are for example cast into the baseplate. For example, a pump may be fastenable on the baseplate directly or via an adapter. In this way, vibrating components, for example the pump, are rigidly connected to the baseplate, whereby a reduction of the noise emissions owing to airborne sound and body-borne sound can be achieved. In other words, an absorption of body-borne sound can be realized by means of damping characteristics of polymer concrete. Owing to the relatively high mass of the baseplate, it is furthermore possible for a natural frequency of the vibration of the vibrating components to be shifted, or for a natural-frequency vibration to be dampened. The baseplate may thus, in other words, have a vibration-damping action.

It is furthermore advantageous for at least one wall or a housing to be provided which engages around the appliance, which is supported by the baseplate, at least in certain portions. The wall may particularly preferably be supported on the support surface of the baseplate or on one of the support surface portions. The wall may particularly preferably be connected to the baseplate by at least one fastening means. The wall is preferably arranged at encircling outer edges of the baseplate. The wall may for example have a carrying structure for at least one component or multiple components of the appliance. It is furthermore possible for a sealing element to be provided between the wall and the baseplate, which sealing element seals off said transition in particular in fluid-tight fashion. Here, the support surface on which the wall is supported may advantageously be of sufficiently smooth form. The wall can thus additionally have a fluid-collecting action, whereby a leakage oil volume can further increase. It is advantageously additionally possible for acoustic emissions of the appliance to be reduced by means of the wall. The wall may thus have sound-damping structures and thus have damping action on the airborne sound.

It is advantageous, in the case of the baseplate, for a run-off device to be provided by means of which the leakage oil that has been collected by the collecting surface, for example in the channel, can be drained from or can run off from the baseplate. For this purpose, a run-off slope may be formed into the baseplate such that said run-off slope is inclined downward in the direction of gravitational force proceeding from the channel, such that the run-off slope forms the lowest point of the collecting surface. The run-off slope may advantageously be adjoined by a run-off element which is arranged at an outer periphery in relation to the baseplate and which can regulate the run-off of the leakage oil. The run-off element may for example be a run-off connector, and this may additionally have, for example, a ballcock. Also conceivable is a closure plate which is connected sealingly to the baseplate and which can be opened and closed. It is thus possible for leakage oil that has collected in the collecting surface to be drained from the baseplate at a desired point in time. It is possible for the run-off element to allow the leakage oil to run off into a further oil pan, which is for example arranged under the baseplate. It is also possible for a hose to be able to be installed onto the run-off element, for example by means of corresponding screw connections, which hose can discharge the leakage oil, for example into a separately situated oil pan. The arrangement of the run-off element at an outer periphery is advantageous because it is thus easily accessible, for example for the installation of a hose or the provision of an oil pan. It is also possible for the run-off device to be formed into the baseplate at a floor side, for example at the position of the channel.

On the bottom side of the baseplate, there is preferably provided at least one transport recess. This may be designed in particular for receiving a lifting means. The transport recess is preferably dimensioned for the transport of at least the baseplate, more preferably for the transport of the partial or entire assembly with the baseplate. In a preferred embodiment, two transport recesses are provided preferably as a pair. These may be designed for example as grooves running parallel, whereby the baseplate can preferably be lifted by means of a fork of an industrial truck or of a forklift truck. The two transport recesses may preferably run parallel to the longer and/or to the shorter edge sides of the baseplate. A crossing profile of the transport recesses is possible, such that the baseplate can be lifted preferably from different sides by a corresponding means of transport, such as for example the industrial truck. Simplified transport of the baseplate and/or of the appliance with the baseplate is thus made possible.

It is advantageously possible for at least one fastening means, preferably at least three and more preferably at least four fastening means, to be provided at the floor side of the baseplate, to which fastening means one or in each case one, in particular height-adjustable, machine foot can be fastened. It is preferable for four machine feet to be provided, in each case at the corners of the baseplate. In this way, the baseplate can also be easily aligned horizontally on an uneven underlying surface or floor.

The support surface may advantageously have multiple support surface portions. Here, it is preferably possible that, for at least one component of the appliance, only one single support surface portion is provided, the area of which corresponds approximately to that of a base area of said component. It is also possible that, for at least one component of the appliance, multiple support surface portions are provided, the total area of which is smaller than a base area of said component. Said support surface portions may advantageously be separated by the collecting surface. It is possible here for the support surface portions to still be coherent, or to at least still be partially coherent. It is thus possible for the collecting surface to also be divided into portions. It is thus possible, for example, for collecting surface portions and support surface portions to be arranged alternately with respect to one another. The support surface portions are preferably arranged in a planar manner on the top side of the baseplate. An arrangement parallel to the top side of the baseplate is likewise possible. It is also possible for the support surface or a respective support surface portion to be arranged so as to be inclined relative to the top side of the baseplate. The collecting surface portions are preferably designed so as to each open into the channel of the collecting surface. They are preferably then arranged so as to be inclined relative to the support surface portions. It is thus advantageously possible for leakage oil that leaks out of a component of the appliance to pass directly onto one of the collecting surface portions, and to flow off from there onward in the direction of the channel of the collecting surface. In this way, dirt that is entrained by the leakage can be deposited in a spatially more concentrated manner than in the case of a collecting surface which is parallel to the ground, whereby, in particular, cleaning of the collecting surface is simplified.

Also provided according to the disclosure is a hydraulic appliance or appliance which may have the baseplate according to one or more of the preceding aspects. The appliance may for example have at least one pump and a motor, and also a tank and various further hydraulic components such as pipes and connectors. The appliance may furthermore have a wall, and components for control, further attachment parts and the like.

What is thus disclosed is a baseplate, wherein, on a top side of the baseplate, there are provided a support surface, on which a hydraulic appliance is fastenable, and a collecting surface, which is lowered in relation to the support surface and which serves for collecting leakage oil of the appliance.

BRIEF DESCRIPTION OF THE DRAWINGS

Preferred exemplary embodiments of the disclosure will be discussed in more detail below on the basis of schematic drawings, in which.

DETAILED DESCRIPTION

Figure 1:
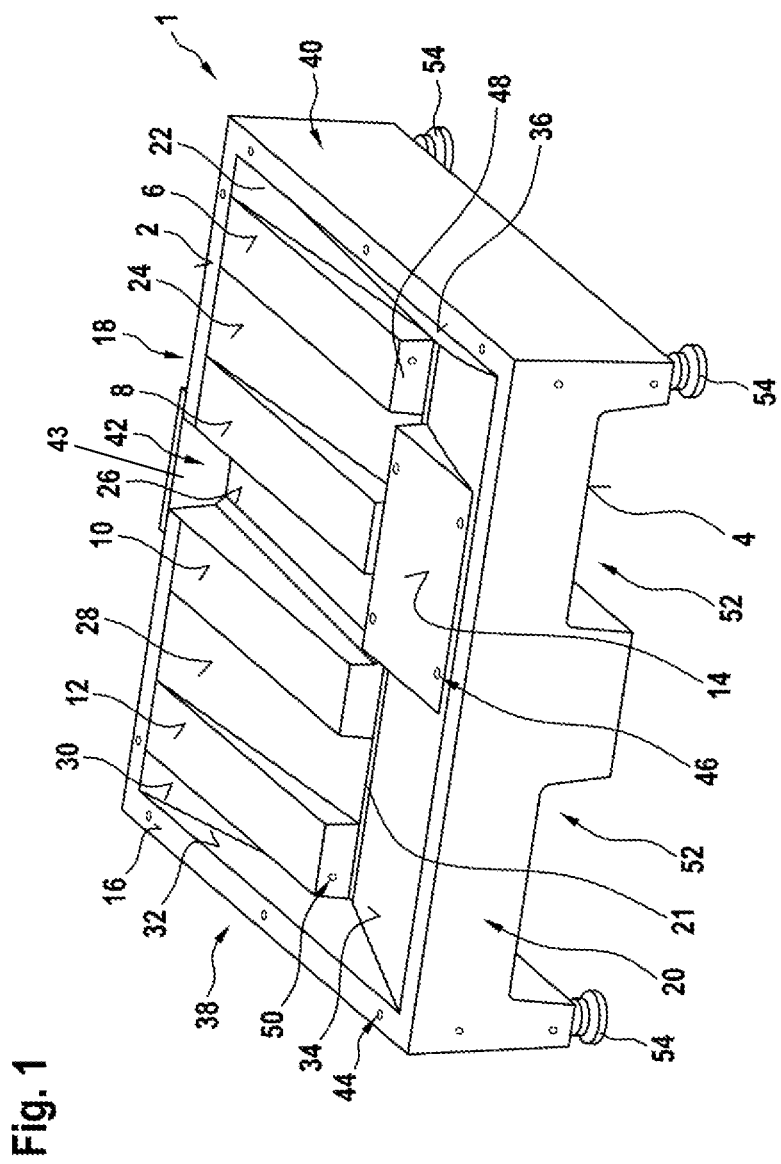
FIG. 1 shows, in a perspective view, a baseplate according to an exemplary embodiment.

FIG. 1 shows the baseplate 1 according to the disclosure. This is produced preferably from polymer concrete. It is of approximately rectangular design and has a top side 2 and a bottom side 4.

On the top side 2, there is formed a support surface, which has four support surface portions 6, 8, 10, 12 for a tank (not shown in FIG. 1), a support surface portion 14 for a drive unit (not shown in FIG. 1) and a support surface portion 16 for a wall or multiple walls or walls or wall portions (not shown in FIG. 1). The support surface portions 6 to 16 are, in the present case, all arranged in a plane. The support surface portion 16 is formed as a narrow, rectangular frame and borders the baseplate 1. The support surface portions 6, 8, 10, 12 extend from a first long side 18 of the rectangular baseplate 1 in parallel in the direction of the second long side 20 as far as a channel 21. The support surface portion 14 extends from the second long side 20 in the direction of the first long side 18 as far as the channel 21.

The channel 21 is arranged in the baseplate 1, parallel to the long sides 18, 20 of the baseplate 1, and, in the present case, is arranged parallel to and spaced apart from the top side 2 of the baseplate 1. Formed between the support surface portions 6 to 14 is a collecting surface, which is lowered at least in certain portions relative to the support surface portions 6 to 14 and which has the collecting surface portions 22 to 36. The collecting surface portions 22 to 36 all open out in the channel 21, whereby the collecting surface is of V-shaped form.

The collecting surface portions 22 to 30 extend from the first long side 18 in the direction of the second long side 20 as far as the channel 21. The collecting surface portions 22 to 30 are in this case arranged in alternation with the support surface portions 6 to 12. The collecting surface portion 32 extends from a first short side 38 of the baseplate 1 into the interior of the baseplate 1 as far as a first end of the channel 21, and the collecting surface portion 36 extends from a second short side of the baseplate 1 into the interior of the baseplate 1 as far as a second end of the channel 21. The collecting surface portion 34 extends from the second long side 20 in the direction of the first long side 18 as far as the channel 21. The collecting surface portion 34 engages around the support surface portion 14.

The collecting surface portions 22, 24, 28, 30 and 34 are inclined such that they slope obliquely downward from the support surface portion 16, which serves as frame, in the direction of the channel 21, such that leakage oil (not shown) from an assembly (not shown) placed onto the baseplate is collected in the collecting surface portions 22 to 36 and the channel 21.

The collecting surface portion 26 is designed so as to run, proceeding from the channel 21, further in the direction of the bottom side 4 of the baseplate 1, such that, at its end pointing away from the channel 21, said collecting surface portion forms a lowest point of the collecting surface. The collecting surface portion 26 is adjoined by a run-off device 42, by means of which the leakage oil can be discharged from the baseplate 1. For this purpose, the baseplate 1 or the frame-like support surface portion 16 has, at this location, for example an opening for a closure plate 43 or a run-off connector (not shown).

Laterally at or in the support surface portion 16, there are provided fastening means 44 (denoted by a reference designation only at one fastening means 44 for the sake of clarity) to which, for example, a wall or wall portions (not shown) can be fastened. For this purpose, in each case 3 fastening means 44 are provided at or in the short sides 38, 40. Two fastening means 44 are provided at the long side 18.

At or in the support surface portion 14, there are provided vertical fastening means 46 (denoted by a reference designation only at one fastening means 46 for the sake of clarity) for the fastening of a drive unit (not shown). Four fastening means 46 are arranged, approximately close to an edge, in the corner regions of the support surface portion 14.

At those ends of the support surface portions 6 to 14 and of the channel 21 which point toward the longitudinal side 20, there is arranged in each case one step portion 48 (denoted by a reference designation only at one step portion 48 for the sake of clarity) which connects the respective support surface portion 6 to 14 to the channel 21. The step portions 48 run approximately perpendicular to the support surface portions 6 to 14. At the step portions 48 of the support surface portions 6 and 12, there are provided in each case lateral fastening means 50, which serve for example for the fastening of a tank (not shown).

Furthermore, as per FIG. 1, two recesses 52 running in each case parallel to the relatively short sides 38, 40 of the baseplate 1 are provided on the bottom side 4 of the baseplate 1, which recesses extend over the entire depth of the baseplate 1. Said recesses serve in particular for receiving forks (not shown) of a lifting means (not shown), for example of an industrial truck, and thus facilitating the transport of the baseplate 1. At the respective corners of the baseplate, at least at a bottom side, there are provided fastening means (not visible in the view) to which machine feet 54 are fastened, which are in particular height-adjustable in order to enable the baseplate 1 to be aligned straight or horizontally for example even on an uneven underlying surface.

Figure 2:
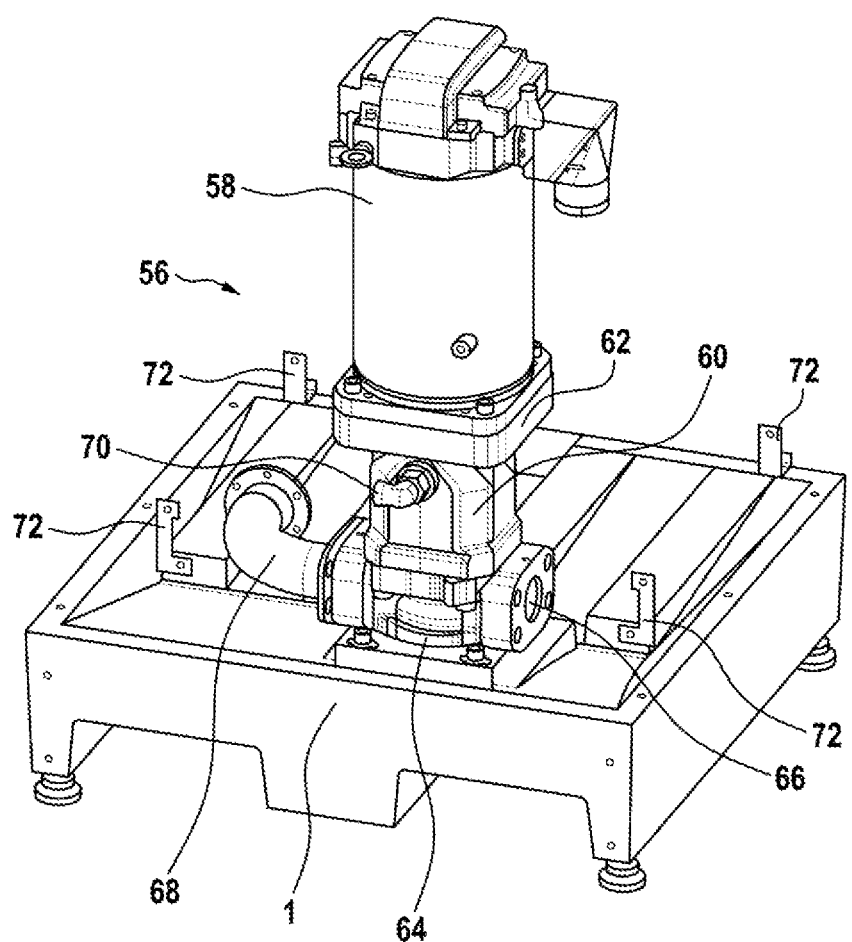
FIG. 2 shows, in a perspective view, the baseplate from FIG. 1 with a motor-pump assembly fastened thereon.

FIG. 2 shows the baseplate 1 from FIG. 1 with a motor-pump assembly 56 fastened thereon. Said motor-pump assembly has a motor 58 and a pump 60, and also a motor-pump adapter 62, which is arranged between the motor 58 and the pump 60. The pump 60 is fastened by means of a pump-polymer concrete adapter 64, and with the aid of the fastening means 46 (see FIG. 1), to the support surface portion 14 (see FIG. 1) of the baseplate 1. The pump additionally has a pressure connection 66, a suction line 68, and a leakage oil port 70.

Furthermore, in FIG. 2, tank fastening brackets 72 are shown which are fastened to the step portions 48 (see FIG. 1) of the support surface portions 6 and 12 by the fastening means 50 and by means of which a tank (not shown) is fastenable to the support surface portions 6 to 12.

Figure 3:
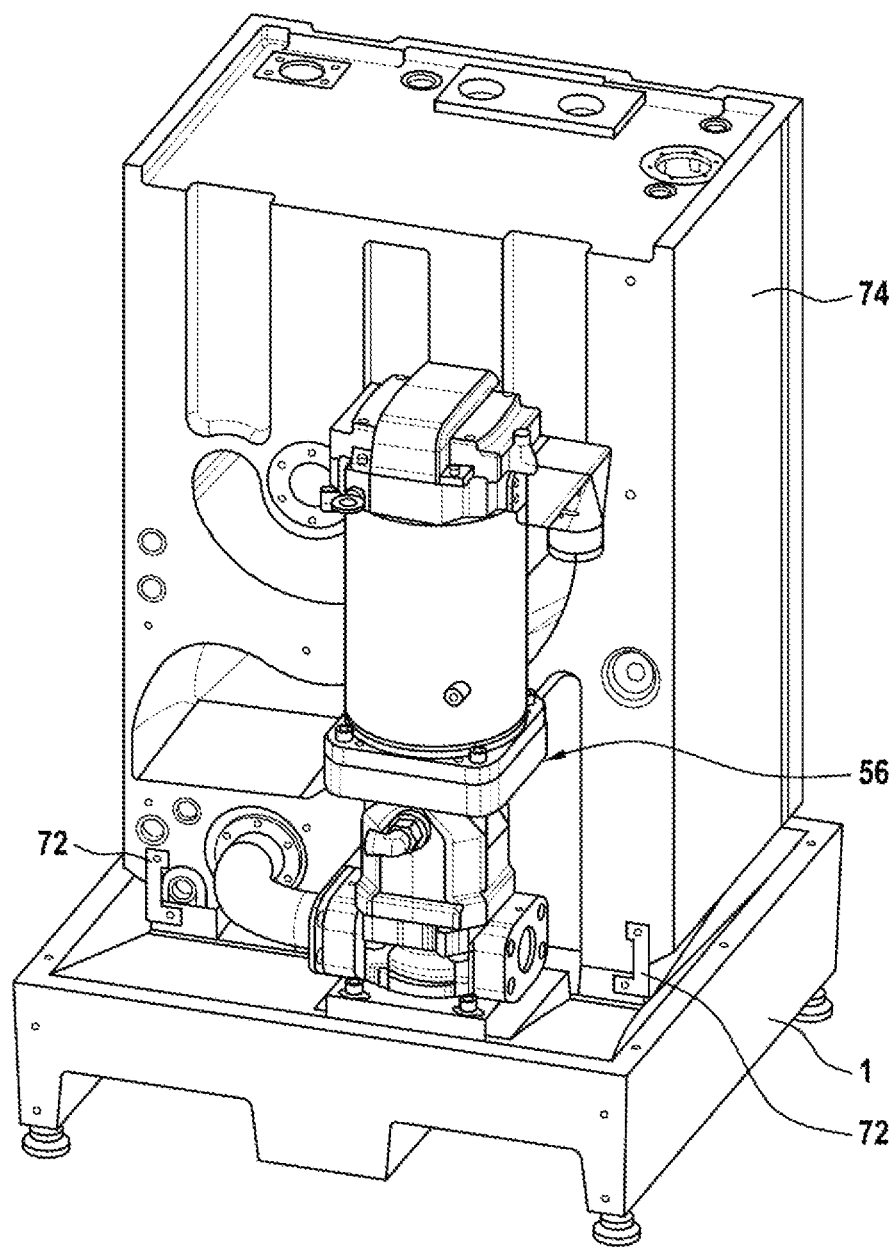
FIG. 3 shows, in a perspective view, the baseplate from FIG. 1 with the motor-pump assembly and with a tank fastened on the baseplate.

FIG. 3 shows the baseplate 1 from FIG. 1, with the motor-pump assembly 56, see FIG. 2, installed thereon, and with a tank 74, which is fastened to the baseplate 1 by the fastening means 50 (see FIG. 1) and the tank fastening brackets 72 (see also FIG. 2).

Figure 4:
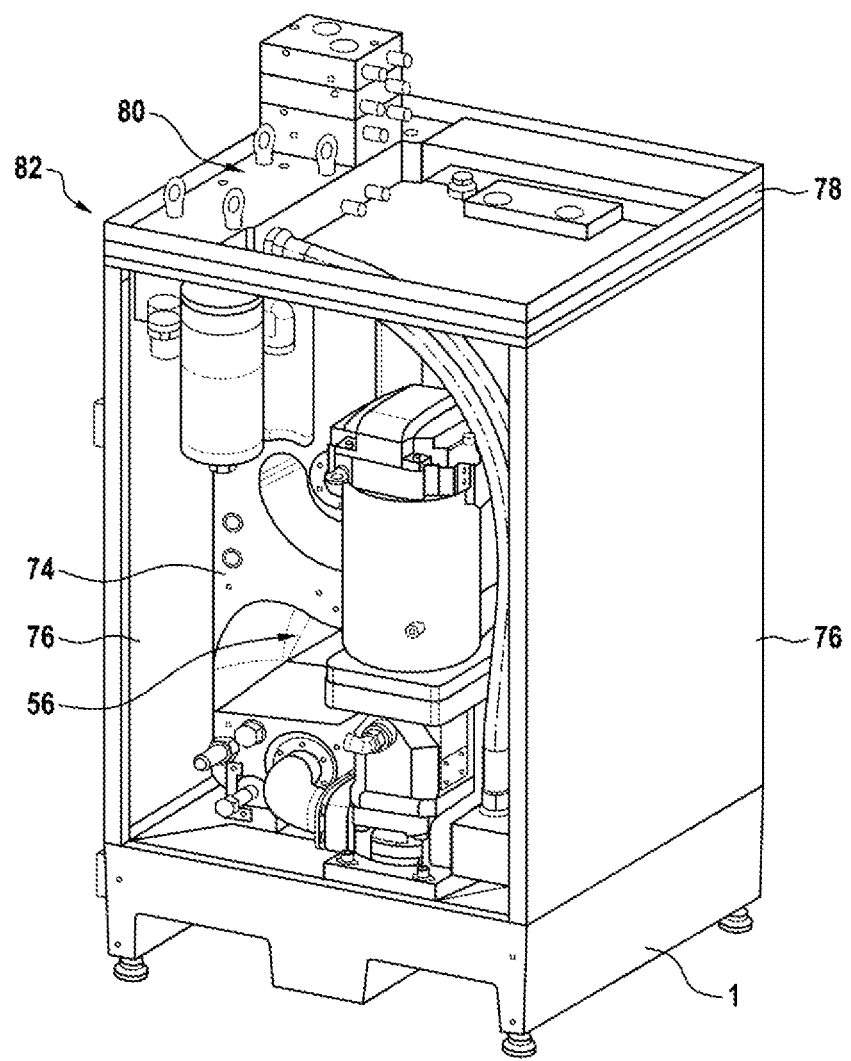
FIG. 4 shows, in a perspective view, the baseplate from FIG. 1 with appliance and side walls fastened thereon.

FIG. 4 shows the baseplate 1 from FIG. 1, with the motor-pump assembly 56, see FIG. 2, installed thereon, and with the tank 74, see FIG. 3. Attached in fluid-tight fashion to the short sides 38 and 40, see FIG. 1, of the baseplate 1 is in each case one wall 76, which has, for example, a sound-damping function and/or a function of carrying, for example, the tank 74. A profile frame 78 is provided at the top end, pointing away from the baseplate 1, of the tank 74. A hydraulic block 80 is fastened to said profile frame. FIG. 4 thus shows an appliance 82 according to the disclosure in the constructed state.

LIST OF REFERENCE DESIGNATIONS

1 Baseplate
2 Top side
4 Bottom side
6, 8, 10, 12, 14, 16 Support surface portion
18, 20 Long side
21 Channel
22, 24, 26, 28, 30, 32, 34, 36 Collecting surface portion
38, 40 Short side
42 Run-off device
44, 46, 50 Fastening means
48 Step portion
52 Recess
54 Machine foot
56 Motor-pump assembly
58 Motor
60 Pump
62 Motor-pump adapter
64 Pump-polymer concrete adapter
66 Pressure port
68 Suction line
70 Leakage oil port
72 Tank fastening bracket
74 Tank
76 Wall
78 Profile frame
80 Hydraulic block
82 Appliance

What is claimed is:

1. A baseplate for one or more of the support, carrying, and fastening of a hydraulic appliance, comprising:
a bottom side arranged close to the ground; and
a top side that includes a support surface and a collecting surface, the support surface configured to support the appliance, the collecting surface lowered in relation to the support surface so as to be configured to collect leakage oil of the appliance, wherein a lower portion of the collecting surface defines a channel configured to collect the leakage oil; and
a run-off device configured to drain collected leakage oil, the run-off device including a run-off slope inclined downwardly from the channel.

2. The baseplate according to claim 1, wherein at least portions of the baseplate include polymer concrete.

3. The baseplate according to claim 1, wherein the baseplate is cast.

4. The baseplate according to claim 1, further comprising at least one fastening mechanism configured to fasten one or more of an entirety of the appliance, at least one component of the appliance, and a further component.

5. The baseplate according to claim 1, wherein the appliance includes at least one wall that engages around the appliance at least in certain portions, the wall supported on the support surface and sealingly connected to the baseplate.

6. The baseplate according to claim 1, wherein the bottom side has at least one transport recess defined extending upwardly from the bottom side, the transport recess configured for transporting the baseplate or the appliance with the baseplate via a lifting device.

7. The baseplate according to claim 1, wherein the support surface has a first support surface portion configured to support a first component of the hydraulic appliance, the first support surface portion having an area that corresponds to a base area of the first component.

8. The baseplate according to claim 1, wherein the support surface has a plurality of support surface portions configured to jointly support a first component of the hydraulic appliance, and wherein a total area of the plurality of support surface portions is smaller than a base area of the first component.

9. The baseplate according to claim 8, wherein the collecting surface includes collecting surface portions interposed between adjacent support surface portions of the plurality of support surface portions.

10. The baseplate according to claim 1, wherein the collecting surface includes a plurality of collecting surface portions that are inclined relative to the support surface.

11. The baseplate according to claim 10, wherein the support surface includes a plurality of support surface portions, each support surface portion of the plurality of support surface portions separated from adjacent support surface portions by a respective collecting surface portion of the plurality of collecting surface portions.

12. The baseplate according to claim 11, wherein each support surface of the plurality of support surface portions is arranged in a common plane.

13. A hydraulic appliance, comprising:
a baseplate configured to one or more of support, carry, and fasten the appliance, the baseplate including:
a bottom side arranged close to the ground;
a top side that includes a support surface and a collecting surface, the support surface configured to support the appliance, the collecting surface lowered in relation to the support surface so as to be configured to collect leakage oil of the appliance, wherein a lower portion of the collecting surface defines a channel configured to collect the leakage oil; and a run-off device configured to drain collected leakage oil, the run-off device including a run-off slope inclined downwardly from the channel.

14. A baseplate for one or more of the support, carrying, and fastening of a hydraulic appliance, comprising:
a bottom side arranged close to the ground; and
a top side that includes a support surface and a collecting surface, the support surface configured to support the appliance, the collecting surface lowered in relation to the support surface so as to be configured to collect leakage oil of the appliance, wherein:
the collecting surface includes a plurality of collecting surface portions that are inclined relative to the support surface;
the support surface includes a plurality of support surface portions, each support surface portion of the plurality of support surface portions separated from adjacent support surface portions by a respective collecting surface portion of the plurality of collecting surface portions;
the baseplate has a plurality of sides; and
support surface portions of the plurality of support surface portions are inclined downwardly from one of the plurality of sides toward a central region that defines a channel configured to collect the leakage oil.

15. The baseplate according to claim 14, wherein a lower portion of the collecting surface defines the channel.

16. The baseplate according to claim 14, wherein the support surface portions include at least one support surface portion inclined downwardly from each side of the plurality of sides toward the channel.

17. The baseplate according to claim 8, wherein:
the support surface further comprises a second support surface portion configured to support a second component of the hydraulic appliance, the second support surface portion having an area that corresponds to a base area of the second component; and
the collecting surface includes a collecting surface portion interposed between the first and second support surface portions.

* * * * *